United States Patent [19]

Khare

[11] Patent Number: 5,710,083

[45] Date of Patent: Jan. 20, 1998

[54] PROCESS TO REJUVENATE SPENT ZINC OXIDE SORBENTS

[75] Inventor: Gyanesh P. Khare, Bartlesville, Okla.

[73] Assignee: Phillips Petroleum Company, Bartlesville, Okla.

[21] Appl. No.: 702,426

[22] Filed: Aug. 14, 1996

[51] Int. Cl.$^6$ .................................................. B01J 20/34
[52] U.S. Cl. ................................ 502/25; 502/22; 502/20
[58] Field of Search .............................. 502/25, 22, 20, 502/400; 423/244.01, 230, 242.1, 220

[56] References Cited

U.S. PATENT DOCUMENTS

| | | | |
|---|---|---|---|
| 4,008,174 | 2/1977 | Jacobson et al. | 252/411 S |
| 4,088,736 | 5/1978 | Courty et al. | 423/230 |
| 4,849,202 | 7/1989 | Lee | 423/574 R |
| 5,094,996 | 3/1992 | Kidd | 502/405 |
| 5,102,854 | 4/1992 | Delzer et al. | 502/410 |
| 5,281,445 | 1/1994 | Khare | 427/445 |
| 5,306,685 | 4/1994 | Khare | 502/253 |
| 5,358,921 | 10/1994 | Kidd et al. | 502/407 |

*Primary Examiner*—Glenn Caldarola
*Assistant Examiner*—In Suk Bullock
*Attorney, Agent, or Firm*—Carl D. Corvin

[57] ABSTRACT

A process to rejuvenate a spent sorbent to produce a rejuvenated sorbent is provided. This process comprises: (a) contacting a spent sorbent with a zinc composition that comprises zinc oxide, or a precursor to zinc oxide, to form a contacted composition; (b) drying said contacted composition at a temperature in the range of about 25° C. to about 375° C. for a time period in the range of about 1 minute to about 24 hours, to form a dried, contacted composition; and (c) calcining said dried, contacted composition at a temperature in the range of about 400° C. to about 800° C. for a time period in the range of about 1 minute to about 24 hours, to form said rejuvenated sorbent.

10 Claims, No Drawings

PROCESS TO REJUVENATE SPENT ZINC OXIDE SORBENTS

This invention relates to the field of processes that produce sorbents. In particular, this invention relates to a process for rejuvenating a spent sorbent to produce a rejuvenated sorbent.

The removal of sulfur from a fluid stream is desirable for a variety of reasons. If a fluid stream is to be released as a waste stream, removal of sulfur from such fluid stream can be necessary to meet sulfur emission requirements. If a fluid stream is to be burned as a fuel, removal of sulfur from such fluid stream can be necessary to prevent environmental pollution. If a fluid stream is to be processed, removal of sulfur is often necessary to prevent the poisoning of sulfur-sensitive catalysts.

Various sorbents have been used to remove sulfur from fluid streams. Sorbents that comprise zinc oxide are especially useful in removing sulfur from fluid streams. However, these zinc-oxide-sorbents tend to gradually lose their sulfur loading capability and thus become less useful. These degraded sorbents are often called spent sorbents. Until now the art has not fully addressed the issue of what to do with these spent sorbents. Consequently, a process to rejuvenate these spent sorbents is greatly needed and desired.

SUMMARY OF THE INVENTION

It is an object of this invention to provide a process to rejuvenate a spent sorbent to produce a rejuvenated sorbent.

In accordance with this invention a process to rejuvenate a spent sorbent to produce a rejuvenated sorbent is provided. This process comprises (or optionally: consists essentially of; or consists of): (a) contacting a spent sorbent with a zinc composition that comprises zinc oxide, or a precursor to zinc oxide, to form a contacted composition; (b) drying said contacted composition at a temperature in the range of about 25° C. to about 375° C. for a time period in the range of about 1 minute to about 24 hours, to form a dried, contacted composition; and (c) calcining said dried, contacted composition at a temperature in the range of about 400° C. to about 800° C. for a time period in the range of about 1 minute to about 24 hours, to form said rejuvenated sorbent.

Other objects of this invention will be apparent to those skilled in the art from the following detailed description of the invention and claims.

DETAILED DESCRIPTION OF THE INVENTION

Sorbents can be used to remove hydrogen sulfide from a fluid stream. The hydrogen sulfide can be produced by the hydrodesulfurization of organic sulfur compounds, or it can be originally present in the fluid stream as hydrogen sulfide. Examples of such fluid streams include: light hydrocarbons such as methane, ethane and natural gas; gases derived from petroleum products and products from extraction, gasification, and/or liquefaction of coal and lignite; gases derived from tar sands and shale oil; coal-derived synthesis gas; gases such as hydrogen and nitrogen; gaseous oxides of carbon; steam and the inert gases such as helium and argon. Additional information concerning the types of processes can be found in U.S. Pat. No. 5,281,445 (the entire disclosure of which is hereby incorporated by reference).

The process to rejuvenate a spent sorbent to form a rejuvenated sorbent comprises, in general, contacting a spent sorbent with a zinc composition that comprises zinc oxide, or a precursor to zinc oxide, to form a contacted composition, drying said contacted composition at a temperature in the range of about 25° C. to about 375° C. for a time period in the range of about 1 minute to about 24 hours, to form a dried, contacted composition, and calcining said dried, contacted composition at a temperature in the range of about 400° C. to about 800° C. for a time period in the range of about 1 minute to about 24 hours, to form said rejuvenated sorbent.

For the purposes of this specification the phrase "spent sorbent" means a sorbent that has been used in a process that removes sulfur from a fluid stream, and that has had its sulfur loading capability diminished when compared to fresh sorbent. These spent sorbents comprise, when they are fresh, zinc oxide. Processes to produce sorbents that comprise zinc oxide are well known in the art and can found in the following U.S. Pat. Nos.: 4,990,318; 5,077,261; 5,094,996; 5,102,854; 5,108,975; 5,130,288; 5,143,706; 5,174,919; 5,177,050; 5,178,843; 5,219,542; 5,244,641; 5,248,489; 5,250,089; 5,268,152; 5,281,445; 5,306,685; 5,310,717; 5,358,921; 5,360,468; 5,370,848; 5,439,867; the entire disclosures of which are hereby incorporated by reference. One of the greatest benefits of this invention comes about when the spent sorbent used in this invention has had its sulfur loading capability diminished by greater than 40 percent.

The spent sorbent is contacted with a zinc composition that comprises zinc oxide, or a precursor to zinc oxide. The zinc composition used in the preparation of the rejuvenated sorbent can be either in the form of zinc oxide, or in the form of zinc oxide precursors that are convertible to zinc oxide under the conditions of preparation described herein. Examples of such zinc oxide precursors include zinc sulfide, zinc sulfate, zinc hydroxide, zinc carbonate, zinc acetate, zinc nitrate and mixtures of any two or more thereof. Preferably, the zinc composition is in the form of a solution of zinc oxide precursor in water, such as, for example, zinc nitrate in water. It is preferred to use a zinc oxide precursor in water solution, as the zinc composition, in order to contact the spent sorbent with the zinc composition, and thereby impregnating the spent sorbent with the zinc composition. The amount of zinc present in the contacted composition is in the range of from about 10 weight percent to about 90 weight percent, and will more preferably be in the range of from 20 weight percent to 80 weight percent, and will most preferably be in the range of from 40 weight percent to 70 weight percent based on the weight of the contacted composition.

The contacted composition is then dried at a temperature from about 25° C. to about 375° C., more preferably, from 50° C. to 300° C., for a time period from about 1 minute to about 24 hours, more preferably, from 1 hour to 6 hours, to form a dried, contacted composition. The dried, contacted composition is then calcined at a temperature from about 400° C. to about 800° C., more preferably, from 500° C. to 700° C., for a time period from about 1 minute to about 24 hours, more preferably, from 1 hour to 6 hours, to form a calcined, dried, contacted composition which is the rejuvenated sorbent. The calcining step can be carried out in air and/or nitrogen. However, it is preferred to carry out the calcining step in a oxygen containing atmosphere.

The rejuvenated sorbent can further comprise metal promoters selected from groups 6 through 11 of the periodic table (see Hawley's Condensed Chemical Dictionary, 11th edition, inside front cover IUPAC nomenclature). Examples of these metal promoters are chromium, molybdenum, tungsten, manganese, technetium, rhenium, iron, ruthenium, osmium, cobalt, rhodium, iridium, nickel, palladium, platinum, copper, silver, and gold. Currently, a preferred metal promoter is nickel. Mixtures of these metal promoters can also be used.

The metal promoter can be added to the rejuvenated sorbent in the form of an elemental metal and/or a metal-containing compound, which is convertible to a metal oxide under the calcining conditions described herein. Some examples of such metal-containing compounds include metal acetates, metal carbonates, metal nitrates, metal sulfates, metal thiocyanates, and mixtures of any two or more thereof.

The elemental metal and/or metal-containing compound can be contacted with the rejuvenated sorbent by any method known in the art. One such method is the impregnation of such sorbent with a solution, either aqueous or organic, that contains the elemental metal and/or metal-containing compound. After the elemental metal and/or metal-containing compound have been contacted with such sorbent, the promoted sorbent is dried and calcined, as herein described.

It should be noted that the elemental metal and/or metal-containing compound can also be mixed with the spent sorbent and zinc composition to form the contacted composition, thereby simplifying the production process.

The metal promoter will generally be present in the rejuvenated sorbent in an amount in the range of from about 0.1 weight percent to about 30 weight percent, and will more preferably be in the range of from 2.0 weight percent to about 15 weight percent based on the weight of the rejuvenated sorbent.

The following example is presented to further illustrate the invention.

EXAMPLE

This example illustrates the rejuvenation of a spent sorbent in accordance with this invention.

Fresh sorbent was used in a hot-gas-cleanup unit until the sorbent had become spent. This sorbent was designated as Sorbent A. Sorbent A was regenerated by contacting it with a gas stream, which contained oxygen, to remove a portion of the sulfur from it. This contacting took place in a temperature range from 535° C. to 760° C. This sorbent was designated Sorbent A-1.

Fifteen grams of Sorbent A-1 was contacted with 13.7 grams of $Zn(NO_3)_2 \cdot 6H_2O$ dissolved in 1.0 mL of hot (about 50° C.) deionized water to form a contacted composition. This contacted composition was then heated in an oven at about 50° C. for one hour and then cooled to ambient. The resulting contacted composition was then dried at about 150° C. for one hour and then calcined, in air, at about 635° C. for one hour. This calcined, dried, contacted composition was designated as Sorbent B.

To test the efficacy of sorbents A-1 and B, they were subjected to a standard sorption test in which each sorbent was alternately contacted with gaseous streams containing either: (1) hydrogen sulfide ($H_2S$) mixed with inert gases, such as, carbon dioxide ($CO_2$) and nitrogen ($N_2$); or (2) steam or air or both. Step (1) is the loading step where the sorbent is loaded with sulfur. Step (2) is the regeneration step where the sorbent has, at least a portion of, the loaded sulfur removed. The reactor temperature for step (1) was about 425° C. to about 540° C. and for step (2) it was about 590° C. to about 760° C. The sulfur loading on the sorbent was determined to be complete when hydrogen sulfide was detected at 100 ppm in the effluent stream, at that point the sulfided sorbent was regenerated in air. The test data for Sorbents A-1 and B are in Table One and Table Two.

TABLE ONE

SULFUR SORPTION TEST RESULTS FOR SORBENT A-1

| | Step (1) Temperature °C. | Step (2) Temperature °C. | Step (2) Gas | Cycle | Sulfur Loading[1] |
|---|---|---|---|---|---|
| Sorbent A-1 | 427 | 593 | Air/$N_2$ | 1 | 3.9 |
| | 427 | 593 | Air/$N_2$ | 2 | 3.6 |
| | 427 | 593 | Air/$N_2$ | 3 | 4.4 |
| | 427 | 593 | Air/$N_2$ | 4 | 4.4 |
| | 427 | 593 | Air/$N_2$ | 5 | 4.6 |
| | 427 | 593 | Air/$N_2$ | 6 | 4.6 |
| | 427 | 593 | Air/$N_2$ | 7 | 4.6 |
| | 427 | 593 | Air/$N_2$ | 8 | 4.6 |
| | 538 | 593 | Air/$N_2$ | 9 | 5.0 |
| | 538 | 593 | Air/$N_2$ | 10 | 5.7 |
| | 538 | 593 | Air/$N_2$ | 11 | 5.7 |
| | 538 | 593 | Air/$N_2$ | 12 | 5.9 |

[1]This is in terms of weight percent sulfur based on the total weight of sorbent.

TABLE TWO

SULFUR SORPTION TEST RESULTS FOR SORBENT B

| | Step (1) Temperature °C. | Step (2) Temperature °C. | Step (2) Gas | Cycle | Sulfur Loading |
|---|---|---|---|---|---|
| Absorbent B | 538 | 593 | Air/$N_2$ | 1 | 8.8 |
| | 538 | 593 | Air/$N_2$ | 2 | 9.4 |
| | 538 | 593 | Air/$N_2$ | 3 | 9.9 |
| | 538 | 593 | Air/$N_2$ | 4 | 10.3 |
| | 538 | 593 | Air/$N_2$/Steam | 5 | 10.7 |
| | 538 | 593 | Air/$N_2$/Steam | 6 | 10.0 |
| | 538 | 760 | Air/$N_2$/Steam | 7 | 8.3 |
| | 538 | 760 | Air/$N_2$/Steam | 8 | 8.3 |
| | 538 | 760 | Air/$N_2$/Steam | 9 | 7.0 |
| | 538 | 593 | Air/$N_2$ | 10 | 8.0 |
| | 538 | 593 | Air/$N_2$ | 11 | not determined |
| | 538 | 593 | Air/$N_2$ | 12 | 10.2 |

These results clearly show that sorbent B, which was produced in accordance with this invention, increases the sulfur loading capacity when compared to sorbent A-1 by about 70 to 80%. Furthermore, it shows that Sorbent B has a sulfur loading capacity suitable for commercial operations.

That which is claimed:

1. A process to rejuvenate a spent zinc oxide sorbent to produce a rejuvenated sorbent said process comprising:

(a) contacting said spent sorbent with a zinc composition that comprises zinc oxide, or a precursor to zinc oxide, to form a contacted composition;

(b) drying said contacted composition at a temperature in the range of about 25° C. to about 375° C. for a time period in the range of about 1 minute to about 24 hours, to form a dried, contacted composition; and (c) calcining said dried, contacted composition at a temperature in the range of about 400° C. to about 800° C. for a time period in the range of about 1 minute to about 24 hours, to form said rejuvenated sorbent.

2. A process according to claim 1 wherein said zinc composition comprises a precursor to zinc oxide selected from the group consisting of zinc sulfide, zinc sulfate, zinc hydroxide, zinc carbonate, zinc acetate, zinc nitrate and mixtures of any two or more thereof.

3. A process according to claim 2 wherein said zinc composition is in the form of a solution of zinc oxide precursor in water.

4. A process according to claim 3 wherein said spent sorbent is impregnated with said solution of zinc oxide precursor in water.

5. A process according to claim 1 wherein the amount of zinc present in the contacted composition is in the range of from about 10 weight percent to about 90 weight percent based on the weight of the contacted composition.

6. A process according to claim 1 wherein said contacted composition is dried at a temperature from 50° C. to 300° C. for a time period from about 1 minute to about 24 hours.

7. A process according to claim 1 wherein said dried, contacted composition is calcined at a temperature from 500° C. to 700° C., for a time period from about 1 minute to about 24 hours.

8. A process according to claim 1 wherein said rejuvenated sorbent further comprises a metal promoter wherein the metal in said metal promoter is selected from the group consisting of chromium, molybdenum, tungsten, manganese, technetium, rhenium, iron, ruthenium, osmium, cobalt, rhodium, iridium, nickel, palladium, platinum, copper, silver, gold, and mixtures thereof.

9. A process according to claim 1 wherein said rejuvenated sorbent further comprises a metal promoter wherein the metal in said metal promoter is nickel.

10. A process to rejuvenate a spent zinc oxide sorbent to produce a rejuvenated sorbent said process consisting essentially of:

(a) contacting said spent sorbent with a zinc composition that consists essentially of a precursor to zinc oxide selected from the group consisting of zinc sulfide, zinc sulfate, zinc hydroxide, zinc carbonate, zinc acetate, zinc nitrate and mixtures of any two or more thereof, to form a contacted composition;

(b) drying said contacted composition at a temperature in the range of 50° C. to 300° C. for a time period in the range of about 1 minute to about 24 hours, to form a dried, contacted composition; and (c) calcining said dried, contacted composition at a temperature in the range of 500° C. to about 700° C. for a time period in the range of about 1 minute to about 24 hours, to form said rejuvenated sorbent.

* * * * *